No. 767,782. PATENTED AUG. 16, 1904.
J. W. WALKER.
PIPE PULLER.
APPLICATION FILED MAR. 21, 1903.
NO MODEL.

J. W. WALKER,
Inventor

Witnesses
Charles Morgan.
Harry Ellis Chandler by Chandler & Chandler
Attorneys

No. 767,782. Patented August 16, 1904.

UNITED STATES PATENT OFFICE.

JAMES W. WALKER, OF WILLOW, INDIANA.

PIPE-PULLER.

SPECIFICATION forming part of Letters Patent No. 767,782, dated August 16, 1904.

Application filed March 21, 1903. Serial No. 148,886. (No model.)

*To all whom it may concern:*

Be it known that I, JAMES W. WALKER, a citizen of the United States, residing at Willow, in the county of Hancock, State of Indiana, have invented certain new and useful Improvements in Pipe-Pullers; and I do hereby declare the following to be a full, clear, and exact description of the invention, such as will enable others skilled in the art to which it appertains to make and use the same.

This invention relates to pipe-pullers such as are employed for pulling the piping of casing from wells, although it will be understood that the puller may be used for any other specific purpose for which it may be adapted.

The object of the invention is to provide an implement of this nature which may be inserted and firmly engaged in the pipe to be pulled and which will hold securely against working strain, but which may be easily and quickly disengaged or disconnected.

A further object of the invention is to provide an implement of this nature which will comprise but few parts, which may be manufactured at a low price, and which will be durable.

Figure 1:
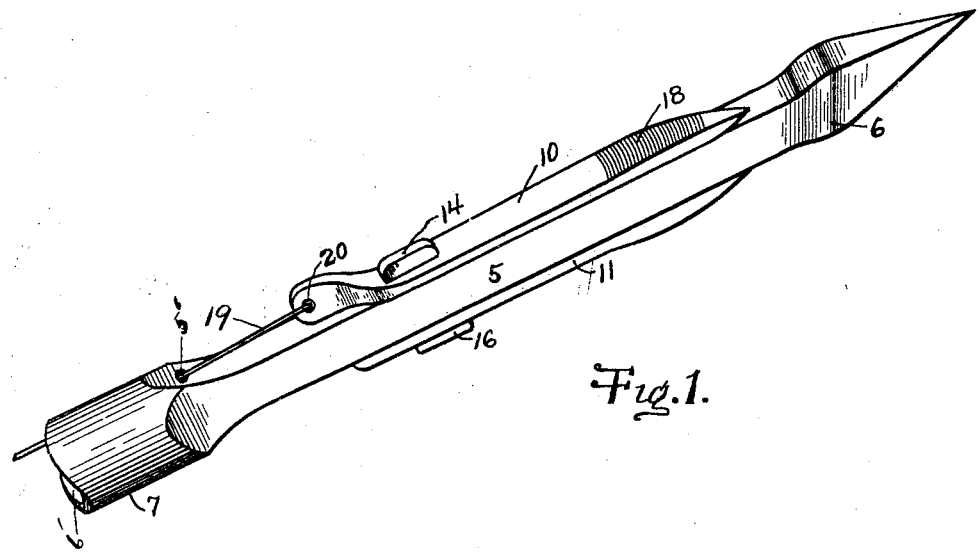
Figure 2:
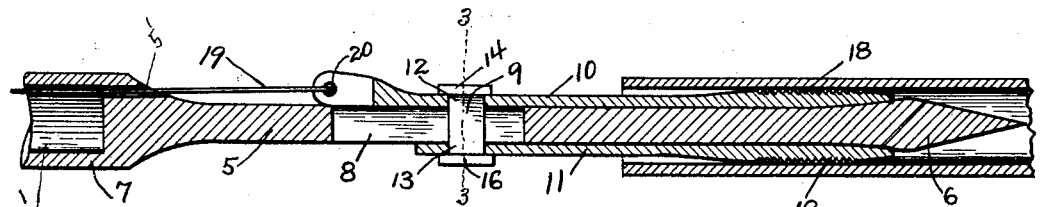
Figure 3:
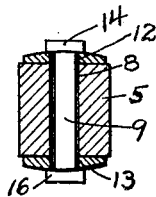

In the drawings forming a portion of this specification, and in which like numerals of reference indicate similar parts in the several views, Figure 1 is a perspective view of the implement with the parts thereof in their inactive positions. Fig. 2 is a section taken longitudinally through the implement and a section of pipe with which it is engaged. Fig. 3 is a section on line 3 3 of Fig. 2.

Referring now to the drawings, the present puller consists of a stem 5, at the base of which is the enlarged portion 7, having a recess 6' in its outer end, in which in practice is connected a pipe or other suitable means for lowering it into the ground. Through the enlarged portion from a point near the stem to the bottom of the recess is a perforation 5'. The stem portion 5 is rectangular in cross-section and is gradually increased in diameter in a direction away from the body portion 7 by forming the sides of the stem to gradually diverge to the head 6, the sides of the extreme end portion of the stem being converged, so that the head 6 is what may be termed "spear-shaped."

Through the stem portion 5 of the implement is formed a longitudinally-extending slot 8, through which is passed the key 9, this key being adapted for sliding movement longitudinally of the slot. The key 9 holds the gripping-jaws 10 and 11 to the stem 5. Each of the gripping-jaws consists of a spring-metal plate of elongated shape, and through these spring-metal plates at one end are formed openings 12 and 13, with which is engaged the key, said key having a head 14 at one end which rests against the outer face of one of the jaws, while its opposite end is passed through the washer 16 and is then riveted to prevent disengagement. The key in question is engaged through the spring-plates at their ends adjacent to the body portion 7, and said plates are increased gradually in thickness to points adjacent to their opposite ends and are then tapered to their extremities, the portions of greatest thickness having their outer faces serrated, as illustrated at 18. The proportions of the parts are such that when the key 9 is moved to its limit in a direction away from the base 7 the opposite ends of the jaws or plates 10 and 11 are moved over the divergent faces of the stem 5 until their extremities extend to the extremity of the stem, it being understood that during this movement of the plates or jaws the serrated portions thereof are moved gradually away from each other.

In the use of the puller the jaws are moved first in the direction of the base 7, so that they may lie in their closest possible relation, and the end of the stem or the head 6 is inserted in the end of the pipe to be drawn, the insertion being sufficient to carry the serrated portions of the jaws into the pipe, the jaws being held in their retracted positions by means of the wire or cord 19, which is engaged with the eye 20 in the end of one of the jaws. After the puller has been inserted to the proper degree the wire or cord is released, so that the jaws slide downwardly of the stem and are expanded, as above described, so as to engage the inner surface of the pipe. The stem is then drawn upwardly through the medium of the pipe or other connection with the body 7, the frictional engagement of the jaws with the interior of the pipe to be drawn being sufficient to hold the jaws against upward movement initially, and as the stem continues upwardly between the jaws the head 6 wedges between the jaws and forces them outwardly, causing them to engage or grip the pipe with an increased intensity. As the body portion 6 is subjected to further strain sufficient to pull the pipe, slipping is prevented by the increased gripping action of the jaws. When it is desired to disengage the puller from the pipe, the stem is pressed downwardly between the jaws, the latter being held against movement with the stem by means of the cord or wire until the jaws release the pipe, when the puller may be readily withdrawn, as may be understood.

What is claimed is—

A pipe-puller comprising a body portion having a recess in its outer end and a perforation passing from the bottom of the recess through the body in a direction away from the said recess, a stem portion rectangular in cross-section, the sides of which diverge gradually in a direction away from the said body portion, the said diverging sides being converged at the extreme end portion of the stem to form a head, the said stem portion having a longitudinal slot passing through it, spring-plates disposed slidably against the faces through which the slot is formed, a key passed through the plates and the slot of the stem and slidable longitudinally of the latter, an extension from one of the plates, and means passing through the said recess and the perforation of the body portion, and connected with the said extension for shifting the plates longitudinally of the stem.

In testimony whereof I affix my signature in presence of two witnesses.

JAMES W. WALKER.

Witnesses:
OWEN M. WALKER,
FRED M. HAMMER.